United States Patent
Fan et al.

(10) Patent No.: US 9,935,407 B2
(45) Date of Patent: Apr. 3, 2018

(54) INTELLIGENT CONNECTOR MODULE FOR ELECTRIC APPLICANCE HAVING FIRST AND SECOND SWITCH ARRAY AND DRIVE UNIT FOR CONTROLLING COMPONENTS

(71) Applicant: Tyco Electronics (Shanghai) Co. Ltd., Shanghai (CN)

(72) Inventors: Mingjie Fan, Shanghai (CN); Yuming Song, Shanghai (CN); Yulin Feng, Shanghai (CN); Feng Dai, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 185 days.

(21) Appl. No.: 14/961,110

(22) Filed: Dec. 7, 2015

(65) Prior Publication Data
US 2016/0087380 A1 Mar. 24, 2016

Related U.S. Application Data

(63) Continuation of application No. PCT/IB2014/061886, filed on Jun. 2, 2014.

(30) Foreign Application Priority Data

Jun. 6, 2013 (CN) .......................... 2013 1 02252248

(51) Int. Cl.
*H01R 13/70* (2006.01)
*H01R 13/66* (2006.01)
(Continued)

(52) U.S. Cl.
CPC ..... *H01R 13/6691* (2013.01); *H01R 13/6675* (2013.01); *H01R 13/70* (2013.01); *H04L 12/2803* (2013.01); *B23Q 1/265* (2013.01)

(58) Field of Classification Search
CPC .......................... H01R 13/6691; B23Q 1/265
See application file for complete search history.

(56) References Cited

U.S. PATENT DOCUMENTS

| 5,600,310 A | 2/1997 | Whipple, III et al. |
| 9,079,278 B2 * | 7/2015 | Pimputkar ............. B23Q 1/265 |

(Continued)

OTHER PUBLICATIONS

David Van Zoest, "Implementation of a Simulated Washing Machine with an Integrated Control Panel and Intra-Appliance Local Interconnect Network Bus", IATC, 53rd Annual Conference, 2002, retrieved from www1.microchip.com/.../en/.../iatcpaper2002.pdf on Dec. 4, 2015, 13 pages.

(Continued)

*Primary Examiner* — Tammara Peyton
(74) *Attorney, Agent, or Firm* — Barley Snyder

(57) ABSTRACT

An intelligent connector module assembly is disclosed. The intelligent connector module assembly has a master control module, at least one first execution component, and an intelligent connector module. The intelligent connector module has a communication and control unit connected to and configured to receive a control signal from the master control module, and a first switch array and drive unit connected to the communication and control unit and to the at least one first execution component. The first switch array and drive unit controls operation of the first execution component in response to the control signal received by the communication and control unit.

19 Claims, 3 Drawing Sheets

(51) Int. Cl.
  *H04L 12/28* (2006.01)
  *B23Q 1/26* (2006.01)

(56) References Cited

U.S. PATENT DOCUMENTS

2009/0296443 A1* 12/2009 Gajapathy ............ G11C 7/1075
                                                        365/51
2012/0239840 A1   9/2012 Pimputkar et al.
2014/0286076 A1*  9/2014 Aoki ........................ G11C 5/06
                                                        365/72

OTHER PUBLICATIONS

PCT International Search Report, International App. No. PCT/IB2014/061886, dated Sep. 19, 2014, 4 pages.

* cited by examiner

INTELLIGENT CONNECTOR MODULE FOR ELECTRIC APPLICANCE HAVING FIRST AND SECOND SWITCH ARRAY AND DRIVE UNIT FOR CONTROLLING COMPONENTS

CROSS-REFERENCE TO RELATED APPLICATIONS

This application is a continuation of International Application No. PCT/IB2014/061886, filed Jun. 2, 2014, which claims priority to Chinese Application No. 2013102252248, filed Jun. 6, 2013.

FIELD OF THE INVENTION

The present invention relates to an electrical connector module, and more particularly, to an intelligent electrical connector module with a modular and distributed structure.

BACKGROUND

Traditional, known home electric appliances use a host computer board connected to a variety of drive components and sensors. An increasing number of processors and sensors have been used in modern home appliances to make them more intelligent and human-oriented, especially in higher level models of an appliance series. However, this leads to a corresponding increase in the number of connection lines between the master control board and the peripheral execution components, which can lead to a difficulty in wiring and signal interference.

Separate development of master control boards for different model levels of the same series, to more easily manage the connections, may result in a lengthy design cycle and a waste of design resources. Conversely, a unified control board design throughout the series may result in numerous redundant design aspects, an increased material cost of products, a high maintenance cost, and necessary replacement of the entire master control board due to a failure of some function.

FIG. 1 illustrates an existing example of a master control board connected with components of a washing machine. For the exemplary washing machine with four water valves, two dispensing valves and two sensors, there are required four signal lines, four second power supply lines and five first power supply lines, all of which are connected directly with the master control board. Complicated bundles of lines result in difficult assembly, and the numerous and long bundles of lines also render the stability of a system insufficient.

SUMMARY

An object of the present invention, among others, is to provide an intelligent connector module of an electrical appliance with a modular and distributed structure that can more easily accommodate a variety of sensor and component demands. The disclosed intelligent connector module assembly has a master control module, at least one first execution component, and an intelligent connector module. The intelligent connector module has a communication and control unit connected to and configured to receive a control signal from the master control module, and a first switch array and drive unit connected to the communication and control unit and to the at least one first execution component. The first switch array and drive unit controls operation of the first execution component in response to the control signal received by the communication and control unit.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of an intelligent connector module. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 2:
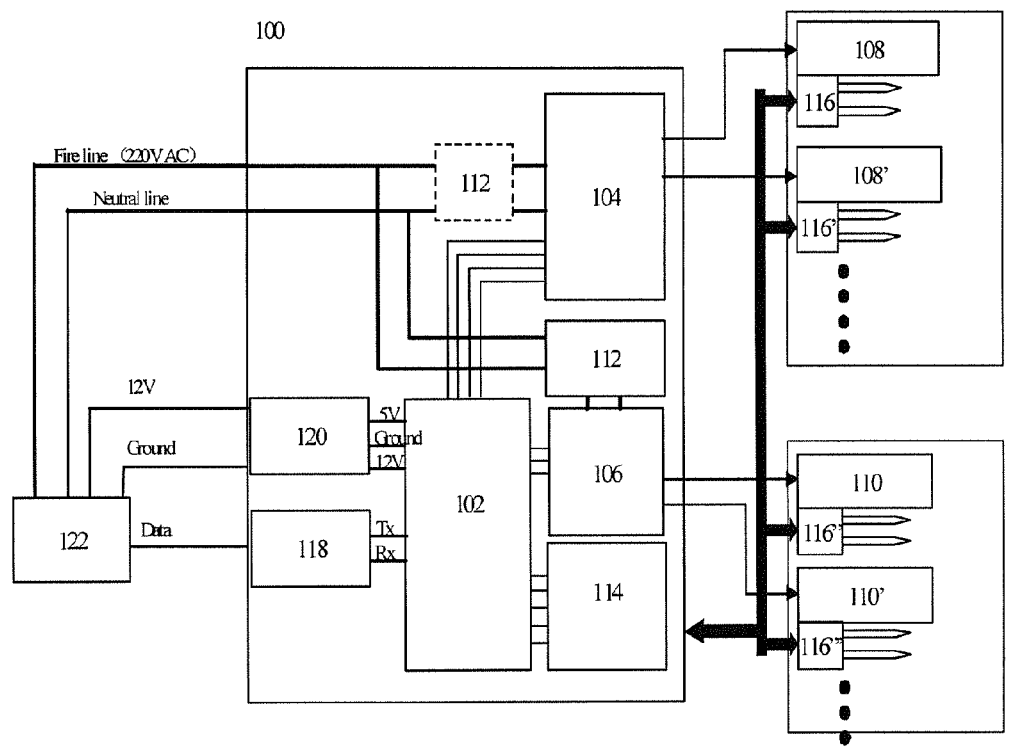
FIG. 2 is a block diagram of electrical modules of an intelligent connector module according to the invention.

FIG. 2 illustrates a block diagram of electrical modules of an intelligent connector module 100 according to an embodiment of the invention. The intelligent connector module 100 is arranged in an electric appliance (not illustrated) with an electric appliance master control module 122, at least one first execution component 108, and at least one second execution component 110. The major components of the invention will now be described in greater detail The master control module 122 is a module configured to control operation of various execution components in the electric appliance. The master control module 122 can generate a control signal for controlling operation of the execution component based upon an instruction generated in response to an input by a user or to an operation application. The master control module 122 can be, for example, a micro control unit, a microprocessor unit or another appropriate module composed of electronic device elements.

The intelligent connector module 100 includes a communication and control unit 102 and a first switch array and drive unit 104. The communication and control unit 102 is communicatively connected with the first switch array and drive unit 104 and includes a communication unit, and a control and processing unit (not illustrated). The communication unit performs processes in the communication protocol, and in the case of a plurality of nodes, further transfers various messages sequentially, on time, and reliably between the various nodes via bus protocol communication. The communication unit also has some error correction, anti-interference and bus failure diagnosis capability.

In some embodiments, the intelligent connector module 100 further includes a second switch array and drive unit 106, the communication and control unit 102 is connected with the second switch array and drive unit 106. An AC full-bridge rectification unit 112 can be arranged between the AC power supply lines input to the intelligent connector module 100 and the first switch array and drive unit 104 to rectify an AC signal into a DC signal.

The intelligent connector module 100 may further include a detection unit 114 and a duplex/half-duplex conversion unit 118. The detection unit 114 is communicatively connected with the communication and control unit 102. The duplex/half-duplex conversion unit 118 is connected between the electric appliance master control module 122 and the communication and control unit 102 to convert duplex and half duplex signals between the electric appliance master control module 122 and the communication and control unit 102.

In some embodiments, the intelligent connector module 100 further includes a DC power supply unit 120. The DC power supply unit 120 is connected with the communication and control unit 102. The DC power supply unit receives a DC power supply signal from the electric appliance master control module and then translates the signal into a DC signal for use in the operation of an element device in the communication and control unit 102 and provides the element device in the communication and control unit 102 with operating voltage. Particularly the element device in the communication and control unit 102 can include a microprocessor configured to control and process information and to control a switch driver in the first switch array and drive unit 104, etc. Those skilled in the art would appreciate that typically the operating voltage of the microprocessor is 5 volts, and the operating voltage of the switch driver is 12 volts, so preferably the DC power supply unit outputs voltage at 5 volts and/or 12 volts.

The first execution components 108 are components of the electrical appliance. A plurality of the first execution components 108 can be of the same type, for example, a plurality of first execution components 108 in a washing machine can be a plurality of identical water valves, or can be execution components of different types, for example, a plurality of execution components in an air conditioner can be an indoor fan, an auxiliary heater and other components respectively. It shall be noted that the number of first execution components 108 illustrated in FIG. 2 is merely exemplary, and those skilled in the art would appreciate that the number of execution components bearable by the first switch array and drive unit 104 is typically more than one and can be two or more in a practical application. The number of the first execution components 108 will not be limited to one, and can be two or more, but typically will not exceed the largest number of execution components bearable by the first switch array and drive unit 104. At least one detected unit 116 may be located in the first execution component 108, where the detected unit 116 can be a sensor, an inductor, or the like.

The second execution components 110 are also components of the electrical appliance. A plurality of the second execution components 110 can be of the same type, for example, a plurality of second execution components 110 in a washing machine can be a plurality of identical dispensing valves; or can be execution components of different types, for example, a plurality of second execution components in an air conditioner can be a vertical fan electric motor, a horizontal fan electric motor, a filter grid cleaning electric motor and other components respectively. It should be noted that those skilled in the art would appreciate that the second execution component 110 illustrated in FIG. 2 can alternatively be driven by AC voltage. Moreover, the number of second execution components 110 is merely exemplary, and the number of execution components bearable by the second switch array and drive unit 106 is typically more than one and can be two or more in a practical application. The number of the second execution components 110 will not be limited to one, and can be two or more, but typically will not exceed the largest number of execution components bearable by the second switch array and drive unit 106. At least one detected unit 116 may be located in the second execution component 110, where the detected unit 116 can be a sensor, an inductor, or the like.

The electric appliance master control module 122 is connected with the intelligent connector module 100 through five lines which are two AC power supply lines providing an AC power supply, two DC power supply lines providing a DC power supply and a signal line transmitting and receiving information between the intelligent connector module 100 and the electric appliance master control module 122 respectively. The intelligent connector module 100 is further communicatively connected with at least one first execution component 108 and at least one second execution component 110; the first switch array and drive unit 104 is connected with the first execution component 108, while the second switch array and drive unit 106 is connected with the second execution component 110.

Those skilled in the art shall appreciate that a communication protocol of the intelligent connector module according to an embodiment of the invention can be commonly used various bus protocols, e.g., RS485, CAN, LIN, etc., or other point-to-point communication protocols, e.g., RS-232 and also can be a user-customized proprietary communication protocol for establishment of connection with the electric appliance master control module 122. The number of signal lines in the embodiment can be one or more dependent upon a different option of the communication protocol. Those skilled in the art can appreciate that the master control module 122 and the intelligent connector module 100 according to an embodiment of the invention can be electrically connected via an interface in the form of a connector or directly otherwise.

The electric appliance master control module 122 controls operation of the first execution component 108 and the second execution component 110 through the intelligent connector module 100.

The communication and control unit 102 receives a control signal from the electric appliance master control module 122. The communication and control unit 102 is configured to parse the control signal of the electric appliance master control module 122 and to control the first switch array and drive unit 104 in response to an instruction of the control signal to have the first execution component 108 run or stopped. The control and processing unit of the communication and control unit 102 parses a control instruction and transmits the instruction to the first execution component 108 as required to perform a corresponding function, or acquires detection signals of respective sensor components, performs corresponding filtering and diagnosis, and reports data and a status on a mother board or alters to a failure.

Specifically when the electric appliance master control module 122 needs to have the first execution component 108 run or stopped, the master control module 122 generates a control signal for controlling operation of the first execution component 108. After the electric appliance master control module 122 generates the control signal, the electric appliance master control module 122 transmits the control signal to the communication and control unit 102 in the intelligent connector module 100, and the communication and control unit 102 parses the control signal and selects a corresponding switch in the first switch array and drive unit 104 in response to an instruction parsed from the control signal to be closed or opened. The first switch array and drive unit 104 refers to an array composed of a plurality of unit switches integrated together and configured to drive an execution component 108 communicatively connected therewith.

In an embodiment, when the first execution component 108 is a component driven by alternating current, the AC power supply lines of the electric appliance master control module 122 are connected with the first switch array and drive unit 104, and when a specific switch in the first switch array and drive unit 104 is closed, the AC power supply is conducted to the first execution component 108 corresponding to the switch so that the first execution component 108 is driven by alternating current to operate normally; and when the switch is opened, the AC power supply cannot be conducted to the first execution component 108 through the switch so that the first execution component 108 stops operating. When the first switch array and drive unit 104 is configured to drive the first execution component by alternating current, the switch in the first switch array and drive unit 104 can be embodied as a relay or a silicon controlled rectifier, where the relay can be a solid relay, an electromagnetic relay or another type of relay.

Alternatively, the first switch array and drive unit 104 can provide the first execution component 108 with a DC drive. When the first switch array and drive unit 104 is configured to drive the first execution component by direct current, the switch in the first switch array and drive unit 104 can be embodied as a relay or a silicon controlled rectifier, where the relay can be a solid relay, an electromagnetic relay or another type of relay.

The second switch array and drive unit 106 is connected with at least one second execution component 110. The communication and control unit 102 parses a control signal of the electric appliance master control module 122 and then controls the second switch array and drive unit 106 in response to an instruction of the control signal to have the second execution component 110 run or stopped, where the second execution component 110 is driven by DC voltage. In this embodiment, there can be included an AC full-bridge rectification unit 112 configured to convert AC output from the AC power supply lines among the five-line bus interface into DC, where the AC full-bridge rectification unit 112 is connected with the second switch array and drive unit 106 and provides the second execution component 110 with the DC drive power supply through the second switch array and drive unit 106.

Particularly when the electric appliance master control module 122 needs to have the second execution component 110 run or stopped, the master control module 122 generates a control signal for controlling operation of the second execution component 110. After the electric appliance master control module 122 generates the control signal, the electric appliance master control module 122 transmits the control signal to the communication and control unit 102 in the intelligent connector module 100, and the communication and control unit 102 parses the control signal and selects a corresponding switch in the second switch array and drive unit 106 in response to an instruction, for which the control signal is parsed, to be closed or opened.

In an embodiment, the DC power supply (e.g., the AC full-bridged rectified DC power supply) is connected with the second switch array and drive unit 106, and when a specific switch in the second switch array and drive unit 106 is closed, the DC power supply is conducted to the second execution component 110 corresponding to the switch so that the second execution component 110 is driven to operate normally; and when the switch is opened, the DC power supply cannot be conducted to the second execution component 110 through the switch so that the second execution component 110 stops operating. The switch in the second switch array and drive unit 106 can be embodied as a relay or a silicon controlled rectifier, where the relay can be a solid relay, an electromagnetic relay or another type of relay.

The detection unit 114 is connected with at least one detected unit 116 located in the first and/or execution component. When the electric appliance master control module 122 needs to obtain detection data in the detected unit 116 in the first and/or execution component, the electric appliance master control module 122 will generate a control signal for controlling the detection unit 114 and send it to the communication and control unit 102, and the communication and control unit parses the control signal upon reception thereof to determine the specific detected unit 116 in which detection data needs to be obtained. Thereafter the detection unit 114 establishes communication with the detected unit 116 to be detected and obtains detection data in the detected unit 116 in response to an instruction of the control signal received by the communication and control unit 102 from the electric appliance master control module. The detection unit 114 obtains and then feeds the detection data back to the communication and control unit 102, and the communication and control unit 102 further transmits the detection data to the electric appliance master control module 122.

In some embodiments, the detection data is a voltage value or a frequency value of the detected unit 116. In some embodiments, the electric appliance master control module analyzes the obtained detection data in the detected unit 116 to decide whether to run or stop the first or the second execution component where the detected unit 116 is located. If the first or second execution component needs to be run or stopped, the electric appliance master control module 122 generates a corresponding control signal and transmits it to the communication and control unit 102. The number of the detected units 116 can be one, two or more in a practical application.

The electric appliance master control module 122 may communicate with the duplex/half-duplex conversion unit 118 in a half-duplex mode, and the communication and control unit 102 communicates with the duplex/half-duplex conversion unit 118 in a duplex mode. The duplex/half-duplex conversion unit 118 converts a duplex signal of the communication and control unit into a half-duplex signal for communication with the electric appliance master control module 122 and a half-duplex signal of the electric appliance master control module 122 into a duplex signal for communication with the communication and control unit.

Figure 3:
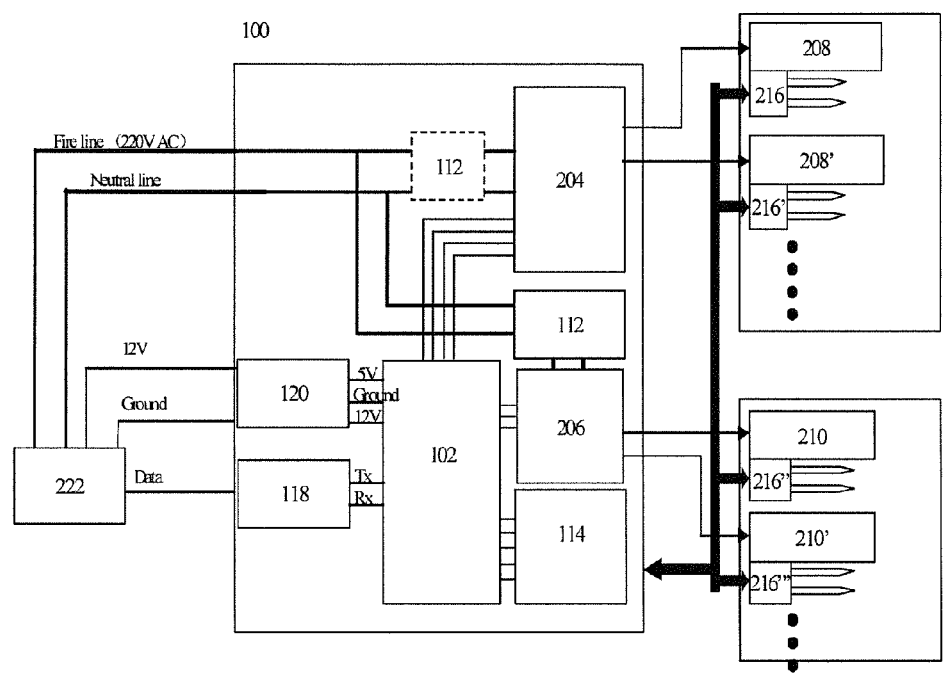
FIG. 3 is a block diagram of a washing machine incorporating the intelligent connector module of FIG. 2.

FIG. 3 illustrates a block diagram of a modular embodiment of a washing machine using the intelligent connector module 100 according to an exemplary embodiment of the invention. The intelligent connector module 100 is arranged in a washing machine (not illustrated), and a washing machine master control board 222 in the washing machine is connected with the intelligent connector module 100 through five lines via a unified power and communication interface, where the five lines are two AC power supply lines providing an AC power supply signal, two DC power supply lines and a signal line transmitting and receiving information between the intelligent connector module 100 and the washing machine master control board 222 respectively. The intelligent connector module 100 is further communicatively connected with at least one water valve 208, and the washing machine master control board 222 controls operation of the water valve 208 through the intelligent connector module 100.

In this embodiment, the intelligent connector module 100 includes a communication and control unit 102 and a water valve switch array and drive unit 204, where the communication and control unit 102 is communicatively connected with the master control board 222 and receives a control signal from the master control board 222. The communication and control unit 102 is communicatively connected with the water valve switch array and drive unit 204, and the water valve switch array and drive unit 204 is communicatively connected with the water valve 208. The communication and control unit 102 is configured to parse the control signal of the master control board 222 and to control the water valve switch array and drive unit 204 in response to an instruction of the control signal to have the water valve 208 to be run or stopped.

Specifically when the master control board 222 needs to have the water valve 208 to be run or stopped, the master control board 222 generates a control signal for controlling operation of the water valve 208. After the master control board 222 generates the control signal, the master control board 222 sends the control signal to the communication and control unit 102 in the intelligent connector module 100. The communication and control unit 102 parses the control signal and selects a corresponding switch in the water valve switch array and drive unit 204 in response to an instruction, for which the control signal is parsed, to be closed or opened. In this embodiment, when the water valve 208 is a component driven by alternating current, the AC power supply lines among the five-line bus interface of the master control board 222 is connected with the water valve switch array and drive unit 204, and when a specific switch in the water valve switch array and drive unit 204 is closed, the AC power supply is conducted to the water valve 208 corresponding to the switch so that the water valve 208 is driven by alternating current to run a water feed job; and when the switch is opened, the AC power supply cannot be conducted to the water valve 208 through the switch so that the water value 208 stops operating.

When the water valve switch array and drive unit 204 is configured to drive the water value by alternating current, the switch in the water valve switch array and drive unit 204 can be embodied as a relay or a silicon controlled rectifier, where the relay can be a solid relay, an electromagnetic relay or another type of relay. Those skilled in the art shall appreciate that when the water value 208 is a component driven by direct current, a rectifier, e.g., an AC full-bridge rectification unit 112, can be arranged between the AC power supply lines input to the intelligent connector module 100 and the water valve switch array and drive unit 204 to rectify an AC signal into a DC signal, and at this time the water valve switch array and drive unit 204 can provide the water value 208 with an DC drive. When the water valve switch array and drive unit 204 is configured to drive the water valve by direct current, the switch in the water valve switch array and drive unit 204 can be embodied as a relay, where the relay can be a solid relay, an electromagnetic relay or another type of relay.

It shall be noted that the number of water valves illustrated in FIG. 3 is merely exemplary, and those skilled in the art shall appreciate that the number of water valves bearable by the water valve switch array and drive unit is typically more than one and can be two or more in a practical application. The number of the water valves 208 will not be limited to one and can be two or more but typically will not exceed the largest number of water valves bearable by the water valve switch array and drive unit 204.

In this embodiment, the intelligent connector module 100 further includes a dispensing valve switch array and drive unit 206, where the communication and control unit 102 is communicatively connected with the dispensing valve switch array and drive unit 206, and the dispensing valve switch array and drive unit 206 is communicatively connected with at least one dispensing valve 210. The communication and control unit 102 is configured to parse a control signal of the master control board 222 and to control the dispensing valve switch array and drive unit 206 in response to an instruction of the control signal to have the dispensing valve 210 to be run or stopped, where the dispensing valve 210 is driven by DC voltage. In this embodiment, there is further included an AC full-bridge rectification unit 112 configured to convert AC output from the AC power supply lines among the five-line bus interface into DC, where the AC full-bridge rectification unit 112 is connected with the dispensing valve switch array and drive unit 206 and provides the dispensing valve 210 with the DC drive power supply through the dispensing valve switch array and drive unit 206.

Particularly when the washing machine master control board 222 needs to have the dispensing valve 210 run or stopped, the washing machine master control board 222 generates a control signal for controlling operation of the dispensing valve 210. After the washing machine master control board 222 generates the control signal, the washing machine master control board 222 transmits the control signal to the communication and control unit 102 in the intelligent connector module 100, and the communication and control unit 102 parses the control signal and selects a corresponding switch in the dispensing valve switch array and drive unit 206 in response to an instruction, for which the control signal is parsed, to be closed or opened. In an embodiment, the DC power supply (e.g., the AC full-bridged rectified DC power supply) is connected with the dispensing valve switch array and drive unit 206, and when a specific switch in the second switch array and drive unit 106 is closed, the DC power supply is conducted to the dispensing valve 210 corresponding to the switch so that the dispensing valve 210 is driven to operate normally; and when the switch is opened, the DC power supply cannot be conducted to the dispensing valve 210 through the switch so that the dispensing valve 210 stops operating. The switch in the dispensing valve switch array and drive unit 206 can be embodied as a relay, where the relay can be a solid relay, an electromagnetic relay or another type of relay.

It should be noted that the number of dispensing valves illustrated in FIG. 3 is merely exemplary, and those skilled in the art would appreciate that the number of dispensing valves bearable by the dispensing valve switch array and drive unit is typically more than one and can be two or more in a practical application. Moreover alike the number of the dispensing valves 210 will not be limited to one and can be two or more but typically will not exceed the largest number of dispensing valves bearable by the dispensing valve switch array and drive unit 206.

In this embodiment, the intelligent connector module 100 further includes a detection unit 114. The detection unit 114 is communicatively connected with the communication and control unit 102, and the detection unit 114 is connected with at least one sensor 216 located in the water valve and/or release valve, where the sensor in the water valve can be a water level sensor, and the sensor in the dispensing valve can be a detergent sensor configured to determine the concentration of a detergent in water by measuring a change in resistance value in water. When the washing machine master control board 222 needs to obtain detection data in the water level sensor 216 of the water valve or the sensor 216 of the dispensing valve, the washing machine master control board 222 generates a control signal for controlling the detection unit 114 and send it to the communication and control unit 102, and the communication and control unit parses the control signal upon reception thereof to determine the specific sensor 216 in which detection data needs to be obtained.

Thereafter the detection unit 114 establishes communication with the sensor 216 to be detected and obtains detection data in the sensor 216 in response to an instruction of the control signal received by the communication and control unit 102 from the washing machine master control board 222. The detection unit 114 obtains and then feeds the detection data back to the communication and control unit 102, and the communication and control unit 102 further transmits the detection data to the washing machine master control module 222. In some embodiments, the detection data is a voltage valve or a frequency valve of the sensor 216, for example, the detergent sensor can judge whether there is a change in resistance value in water by measuring a voltage value. In some embodiments, the electric appliance master control module analyzes the obtained detection data in the sensor 216 to decide whether to run or stop the water valve or the dispensing valve where the sensor 216 is located. The number of the sensors 216 can be one, two or more in a practical application.

In some embodiments, the intelligent connector module 100 further includes a duplex/half-duplex conversion unit 118. The duplex/half-duplex conversion unit 118 is connectively connected between the washing machine master control board 222 and the communication and control unit 102 to convert duplex and half duplex signals between the washing machine master control board 222 and the communication and control unit 102.

In some embodiments, the intelligent connector module 100 further includes a DC power supply unit 120. The DC power supply unit 120 is connected with the communication and control unit 102. The DC power supply unit receives a DC power supply signal on the electric appliance master control module and then translates the signal into a DC signal for use in the operation of an element device in the communication and control unit 102 and provides the element device in the communication and control unit 102 with operating voltage.

Figure 1:
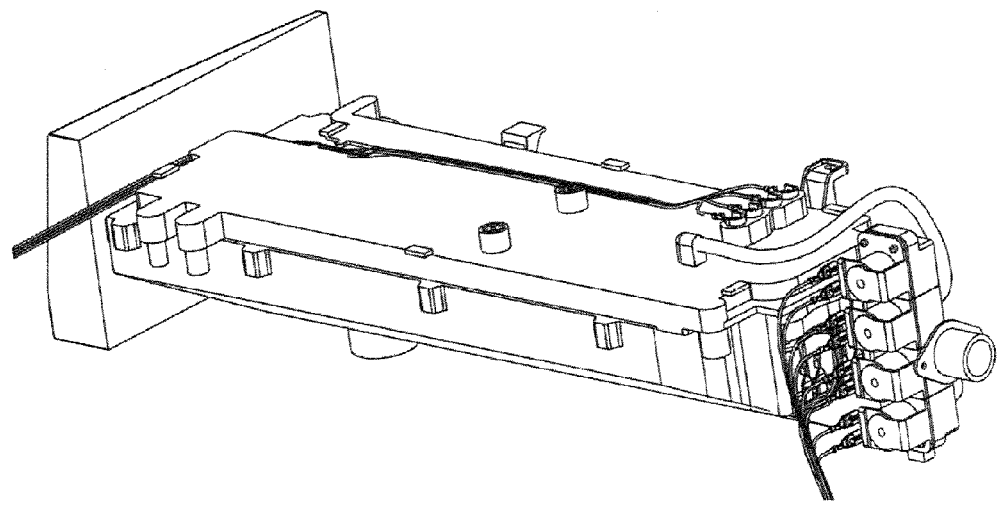
FIG. 1 is a perspective view of a known master control board and execution components of a washing machine.
Figure 4:
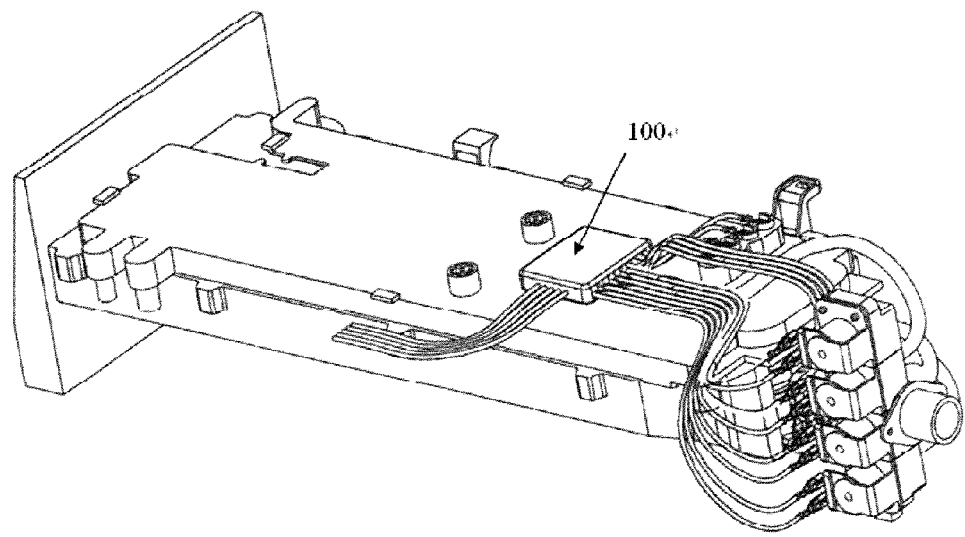
FIG. 4 is a perspective view of the washing machine incorporating the intelligent connector module of FIG. 2.

FIG. 1 illustrates a diagram of an example of a master control board and execution components of a washing machine in the prior art, and FIG. 4 illustrates a diagram of an example of a washing machine using the inventive intelligent connector module 100. As is readily apparent from comparison between them, advantageously, the intelligent connector module 100 has both complicated and variable control functions of execution components and a detection function of a detection unit integrated into a module. The module has a simple and unified power and signal interface to thereby reduce the number of system bundles of lines on the master control module (i.e., the washing machine master control board). This greatly lowers mutual interference between various types of signals, and the unified interface can lower a maintenance cost; it will be sufficient to replace only the present intelligent connector module when there is a failure in a switch control section. Moreover for a signal transmitted in the present module, error correction, check, retransmission acknowledgement and other modern communication signal processing schemes are performed in communication to thereby guarantee excellent reliability of the various types of signals transmitted over a long distance, and thus ensure reliability and stability of the system with increasingly diversified and complicated functions.

Figure 5:
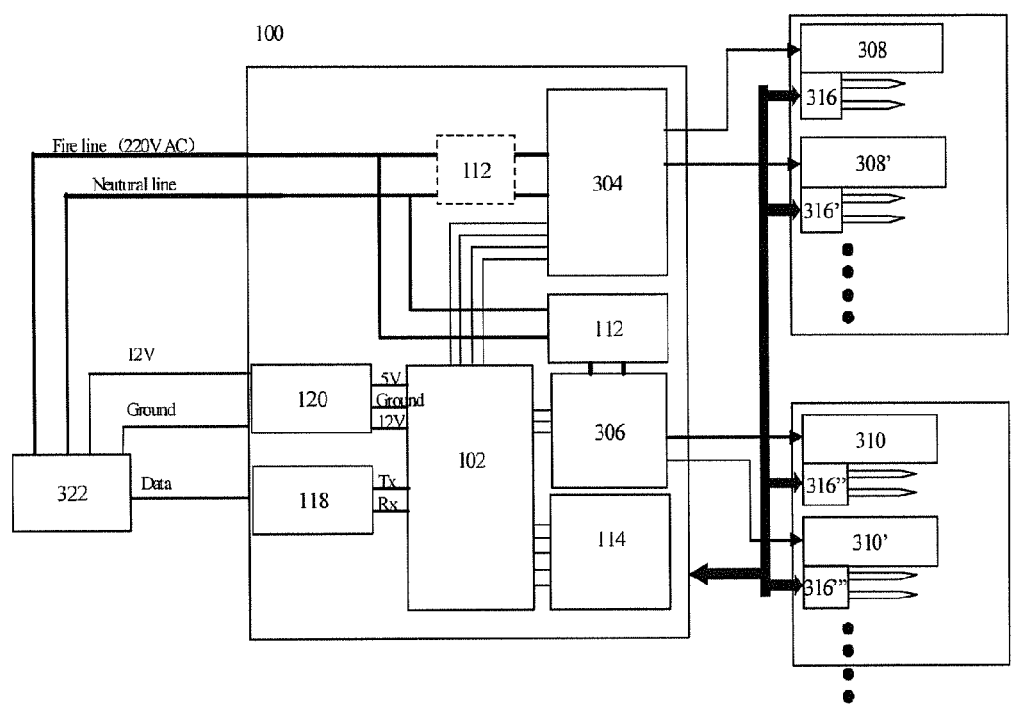
FIG. 5 is a block diagram of an air conditioner incorporating the intelligent connector module of FIG. 2.

Those skilled in the art shall appreciate that an application of the intelligent connection module as referred to in the invention will not be limited to a washing machine but can also be extended to an air condition, a refrigerator and other electric appliances in a practical application. For example, FIG. 5 illustrates a block diagram of a modular embodiment of an air conditioner using the intelligent connector module 100 according to an embodiment of the invention, where an electric appliance master control module 322 is a master control board of the air condition, a first execution component 308 can be an indoor fan, an auxiliary heater or other components, and a second execution component 310 can be a vertical fan electric motor, a horizontal fan electric motor, a filter grid cleaning electric motor or other components respectively. The inventive intelligent connector module can also be equally applicable to the air conditioner illustrated in FIG. 5.

What is claimed is:

1. An intelligent connector module assembly, comprising:
   a master control module;
   at least one first execution component;
   at least one second execution component; and
   an intelligent connector module having a communication and control unit connected to and configured to receive a control signal from the master control module, and having a first switch array and drive unit connected to the communication and control unit and to the at least one first execution component and a second switch array and drive unit connected to the communication and control unit and to the at least one second execution component, the first switch array and drive unit controlling operation of the first execution component in response to the control signal received by the communication and control unit and the second switch array and drive unit controlling operation of the second execution component in response to the control signal received by the communication and control unit.

2. The intelligent connector module assembly of claim 1, wherein the first execution component is driven by alternating current provided by the first switch array and drive unit.

3. The intelligent connector module assembly of claim 2, wherein a switch device in the first switch array and drive unit is a relay or a silicon controlled rectifier.

4. The intelligent connector module assembly of claim 1, wherein the first execution component is driven by direct current provided by the first switch array and drive unit.

5. The intelligent connector module assembly of claim 4, further comprising an AC full-bridge rectification unit connected to the first switch array and drive unit and configured to provide the first execution component with a DC driving voltage through the first switch array and drive unit.

6. The intelligent connector module assembly of claim 5, wherein a switch device in the first switch array and drive unit is a relay.

7. The intelligent connector module assembly of claim 1, wherein the intelligent connector module also has a detection unit connected to at least one first detected unit located in the first execution component and to the communication and control unit.

8. The intelligent connector module assembly of claim 7, wherein the detection unit obtains detection data from the first detected unit in response to the control signal received by the communication and control unit, and communicates the detection data back to the communication and control unit.

9. The intelligent connector module assembly of claim 1, wherein the second execution component is driven by direct current provided by the second switch array and drive unit.

10. The intelligent connector module assembly of claim 9, further comprising an AC full-bridge rectification unit connected to the second switch array and drive unit and configured to provide the second execution component with a DC driving voltage through the second switch array and drive unit.

11. The intelligent connector module assembly of claim 10, wherein a switch device in the second switch array and drive unit is a relay.

12. The intelligent connector module assembly of claim 11, wherein the intelligent connector module also has a detection unit connected to at least one second detected unit located in the second execution component and to the communication and control unit.

13. The intelligent connector module assembly of claim 12, wherein the detection unit obtains detection data from the second detected unit in response to the control signal received by the communication and control unit, and communicates the detection data back to the communication and control unit.

14. The intelligent connector module assembly of claim 13, wherein the detection data is a voltage value or frequency value of the detected unit.

15. The intelligent connector module assembly of claim 14, wherein the intelligent connector module also has a duplex/half-duplex conversion unit connected to the master control module and to the communication and control unit, the duplex/half-duplex conversion unit configured to adjust a signal interaction mode between the communication and control unit and the master control module.

16. The intelligent connector module assembly of claim 15, wherein the intelligent connector module also has a DC power supply unit connected to the communication and control unit and configured to provide the communication and control unit with a DC operating power supply.

17. The intelligent connector module assembly of claim 16, wherein output voltage of the DC power supply unit is a DC voltage at 12 volts and/or 5 volts.

18. An electrical appliance, comprising:
a master control module;
at least one first execution component;
at least one second execution component; and
an intelligent connector module having a communication and control unit connected to and configured to receive a control signal from the master control module, and having a first switch array and drive unit connected to the communication and control unit and to the at least one first execution component and a second switch array and drive unit connected to the communication and control unit and to the at least one second execution component, the first switch array and drive unit controlling operation of the first execution component in response to the control signal received by the communication and control unit and the second switch array and drive unit controlling operation of the second execution component in response to the control signal received by the communication and control unit.

19. The electrical appliance of claim 18, wherein the electrical appliance is a washing machine, a refrigerator, or an air conditioner.

* * * * *